US009850881B2

(12) United States Patent
Baun et al.

(10) Patent No.: US 9,850,881 B2
(45) Date of Patent: Dec. 26, 2017

(54) SEALING SYSTEM AND METHOD OF MAINTAINING A CLEAN ENVIRONMENT IN A WIND TURBINE BY ABSORBING LUBRICANT USED IN THE PITCH OR YAW BEARINGS

(75) Inventors: Torben Friis Baun, Skødstrup (DK); Robert Rowntree, Cheshire (GB)

(73) Assignee: Vestas Wind Systems A/S, Aarhus N. (DK)

( * ) Notice: Subject to any disclaimer, the term of this patent is extended or adjusted under 35 U.S.C. 154(b) by 874 days.

(21) Appl. No.: 14/000,128

(22) PCT Filed: Feb. 21, 2012

(86) PCT No.: PCT/DK2012/050057
§ 371 (c)(1),
(2), (4) Date: Jan. 6, 2014

(87) PCT Pub. No.: WO2012/113402
PCT Pub. Date: Aug. 30, 2012

(65) Prior Publication Data
US 2014/0186153 A1    Jul. 3, 2014

Related U.S. Application Data

(60) Provisional application No. 61/444,794, filed on Feb. 21, 2011.

(51) Int. Cl.
*F03D 80/70* (2016.01)
*F03D 11/00* (2006.01)
*F03D 7/02* (2006.01)

(52) U.S. Cl.
CPC ........ *F03D 11/0008* (2013.01); *F03D 7/0224* (2013.01); *F03D 80/70* (2016.05);
(Continued)

(58) Field of Classification Search
CPC ...... F03D 80/00; F03D 80/70; F05B 2240/54; F05B 2240/57; F05B 2260/603; F05B 2260/98
See application file for complete search history.

(56) References Cited

U.S. PATENT DOCUMENTS 2,009,281 A * 7/1935 Stein ................. F16C 33/78
                                                          277/384
3,727,996 A    4/1973 Davich
(Continued)

FOREIGN PATENT DOCUMENTS

DE        4104452 A1      8/1991

OTHER PUBLICATIONS

Spacing and Sealing, Metric Felt Company, Mar. 31, 2009, web site capture.*
(Continued)

*Primary Examiner* — Woody Lee, Jr.
*Assistant Examiner* — Brian O Peters
(74) *Attorney, Agent, or Firm* — Wood Herron & Evans LLP

(57) ABSTRACT

A sealing system for a wind turbine comprises first component and a second component positioned proximate the first component and movable relative thereto. An absorbent element is secured to the first component and comprises an oil-absorbent material. A contact member is secured to the absorbent element and comprises a non-absorbent material. The contact member abuts the second component so that lubricant leaking from between the first and second components is collected by the absorbent element. A method of maintain a clean environment in a wind turbine with such a sealing system is also disclosed.

23 Claims, 8 Drawing Sheets

(52) U.S. Cl.
CPC ....... *F05B 2240/54* (2013.01); *F05B 2240/57* (2013.01); *F05B 2260/98* (2013.01); *Y02E 10/723* (2013.01)

(56) References Cited

U.S. PATENT DOCUMENTS

| | | | | |
|---|---|---|---|---|
| 5,186,473 | A * | 2/1993 | Windges | D01G 15/32 19/98 |
| 5,596,235 | A * | 1/1997 | Yazaki | H02K 5/124 310/67 R |
| 7,434,813 | B1 * | 10/2008 | Franceschini | F16J 15/3288 277/355 |
| 8,003,582 | B2 * | 8/2011 | Mikami | B61F 17/30 508/110 |
| 8,043,012 | B2 * | 10/2011 | Rogall | F16C 33/76 277/355 |
| 8,212,372 | B2 * | 7/2012 | Fujioka | F16J 15/002 290/44 |
| 8,262,347 | B2 * | 9/2012 | Wallace | F16N 31/004 290/55 |
| 8,366,390 | B2 * | 2/2013 | Tiscareno | F16C 19/08 384/473 |
| 2010/0124507 | A1 | 5/2010 | Wallace | |
| 2010/0135607 | A1 | 6/2010 | Rogall | |
| 2012/0301302 | A1 * | 11/2012 | Takeuchi | F03D 15/00 416/174 |

OTHER PUBLICATIONS

International Searching Authority, Search Report and Written Opinion issued in corresponding International Application No. PCT/DK2012/050057 dated Jun. 26, 2012, 13 pages.

\* cited by examiner

SEALING SYSTEM AND METHOD OF MAINTAINING A CLEAN ENVIRONMENT IN A WIND TURBINE BY ABSORBING LUBRICANT USED IN THE PITCH OR YAW BEARINGS

TECHNICAL FIELD

This application relates generally to sealing systems and, more particularly, to sealing systems for wind turbine bearings and a method of maintaining a clean environment in a wind turbine with sealing systems.

BACKGROUND

Wind turbines are used to produce electrical energy using a renewable resource and without combusting a fossil fuel. In general, a wind turbine converts kinetic energy from the wind into mechanical energy and then subsequently converts the mechanical energy into electrical power. A horizontal-axis wind turbine typically includes a tower, a nacelle supported by the tower, and a rotor mounted to the nacelle. The rotor is coupled via a drive train to a generator housed inside the nacelle. The rotor includes a central hub and a plurality of blades (e.g., three blades) mounted to and extending radially from the hub.

A modern wind turbine has many moving parts that facilitate converting the kinetic energy of the wind into electrical energy. As such, a wind turbine typically includes many bearings that provide relative movement between adjacent parts in a relatively efficient, low-friction manner. For example, in most wind turbines the nacelle is rotatably mounted to the tower so that a yaw system may be used to control the angle of the rotor plane (i.e., the area swept by the blades) relative to the wind direction. Additionally, the blades are rotatably mounted to the hub so that a pitch system may be used to control the pitch of the blades relative to the wind direction (e.g., the blades are rotated about their longitudinal axis). Blade bearings, yaw bearings, and other bearings therefore play an important role in optimizing the operation of the wind turbine.

Bearings typically require lubrication to operate with low friction and prolong their lifetime. Most bearings in a wind turbine include first and second components, such as first and second rings, movable relative to each other. Additionally, there are often structural elements, such as roller elements or sliding pads, positioned between the first and second components. The lubrication is provided between the first and second components to reduce surface fatigue and wear. One challenge, however, is to confine the lubrication to this space so that it does not pollute or dirty other nearby components and the surrounding areas. Lubrication in unintended areas may require cleaning prior to service and maintenance operations in those areas, thereby adding time and costs to the operations. Moreover, the available space within a wind turbine is limited and access to areas is often restricted, making the cleaning itself challenging.

Most bearings include a seal to prevent leakage of lubricant. The seal is typically a rubber element positioned between the moving components of the bearing. Although such seals may be satisfactory in many situations, the potential for unintended leakage remains. The seals may wear over time, especially if rust or corrosion develops on the surfaces of the bearing rings. This may compromise the ability of a seal to confine the lubricant between the rings. Additionally, replacement of a worn seal may be difficult or even impossible without removing the bearing given the confined space of a wind turbine. Therefore, replacement may be costly and increase the downtime of the wind turbine.

SUMMARY

A sealing system for containing lubricant is described below. The sealing system generally comprises a first component, a second component positioned proximate the first component and movable relative thereto, and an absorbent element secured to the first component. The absorbent element comprises an oil-absorbing material. A contact member is secured to the absorbent element. The contact member abuts the second component and comprises a non-absorbent material.

Advantageously, such an arrangement helps prevents the leaking or spreading of lubricant from between the first and second components to areas beyond the sealing system. The absorbent element is effectively fixed relative to the first component and contact member, the latter being what contacts the second component. By remaining "stationary," the absorbent element can collect lubricant without concerns of wear, etc. Moreover, the interaction between the contact member and absorbent element not only permits the relative movement, but also creates resistance to leakage so that the leaking lubricant flows to the absorbent element instead.

The first and second components may be first and second rings of a bearing. Indeed, the sealing system is particularly advantageous when used in connection with a bearing of a wind turbine because of the confined space of a wind turbine and the special needs to maintain a clean environment for service operations, visual appearance, or the like. Accordingly, a wind turbine is also described below. The wind turbine comprises a tower, a nacelle supported by the tower, and a rotor having a hub rotatably mounted to the nacelle and at least one blade rotatably mounted to the hub. The bearing is positioned between the tower and nacelle (e.g., a yaw bearing) or between the hub and blade (e.g., a blade bearing). The first and second rings of the bearing are movable relative to each other and secured to different ones of the previously-mentioned components (the tower, nacelle, hub, or blade). The absorbent element of the sealing system is secured to the first ring. The contact member abuts at least one of the second ring and component to which the second ring is secured.

A method of maintaining a clean environment in a wind turbine using the sealing system is also described. The method generally comprises providing lubricant between first and second components positioned proximate each other, securing the absorbent element to the first component, operating the wind turbine so that the first and second components move relative to each other in different directions, and collecting lubricant with the absorbent element. As mentioned, the absorbent element comprises an oil-absorbent material. The contact member, which is secured to the absorbent element, abuts the second component when the absorbent element is secured to the first component.

In a further aspect or embodiment, the lubricant comprises an oil and a thickener. The absorbent element is oleophilic and thickener-phobic such that the oil is absorbed and the thickener is repelled. The thickener may then accumulate to help block further leakage. Thus, the sealing system becomes "self-sealing" and may allow the use of lubricants with less thickener.

DETAILED DESCRIPTION

Figure 1:
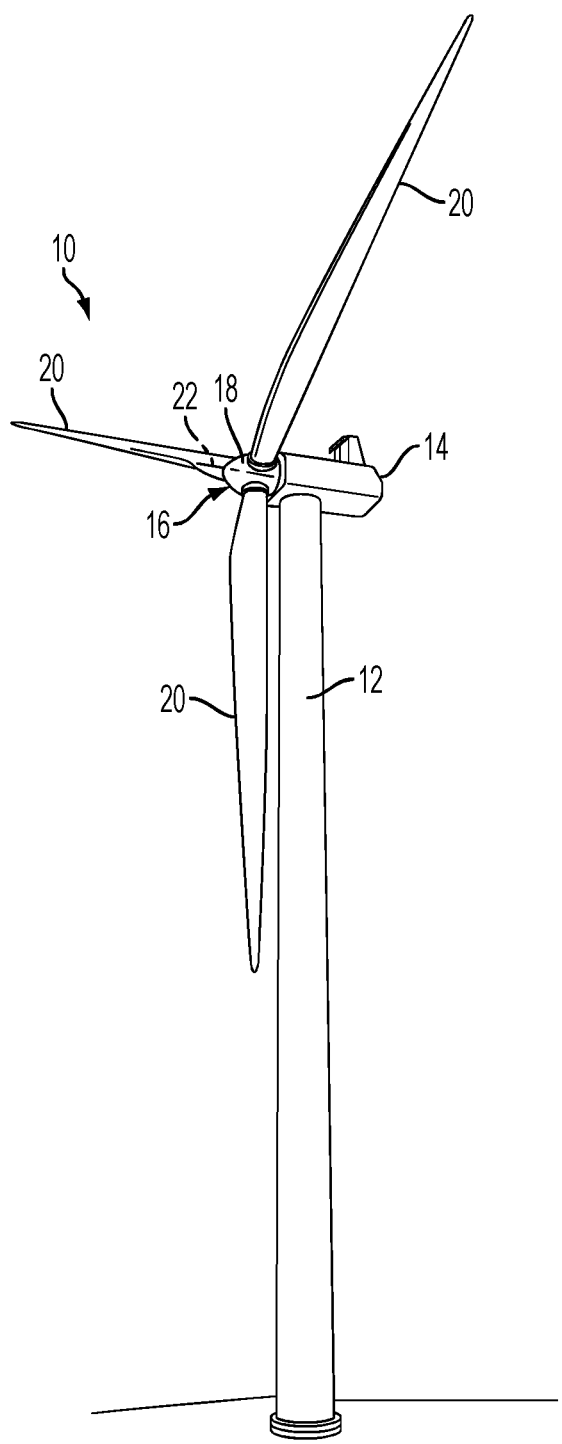
FIG. 1 is a perspective view of one embodiment of a wind turbine.
Figure 2:
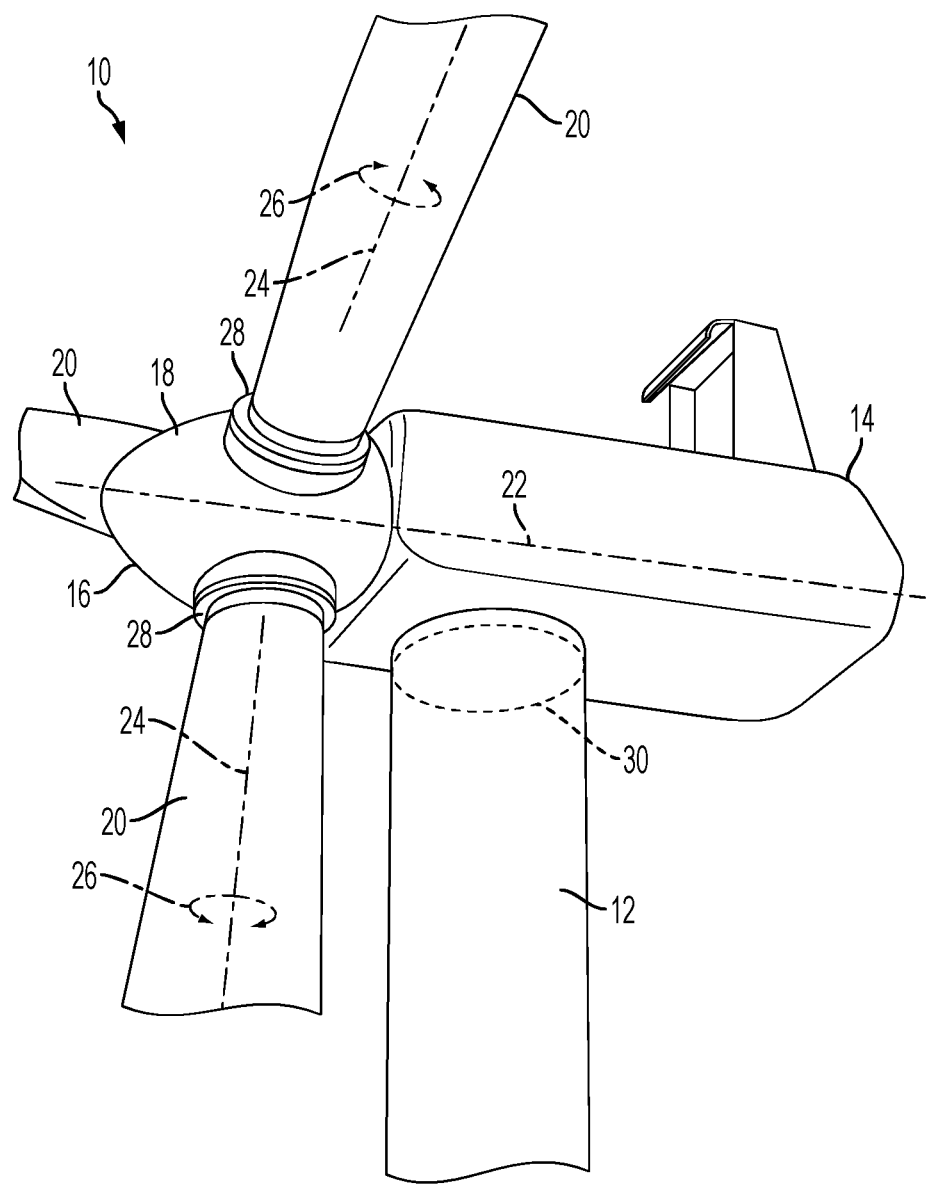
FIG. 2 is an enlarged perspective view of a portion of the wind turbine of FIG. 1.

With reference to FIGS. 1 and 2, an exemplary wind turbine 10 includes a tower 12, a nacelle 14 disposed at the top of the tower 12, and a rotor 16 coupled to a generator (not shown) housed inside the nacelle 14. The rotor 16 of the wind turbine 10 serves as the prime mover for the electromechanical system. Wind exceeding a minimum level will activate the rotor 16 and cause rotation in a direction substantially perpendicular to the wind direction. This rotational mechanical energy is transferred by a drive train (with or without a gear stage) to the generator, which converts it to electrical energy as is well known.

There are many components in the wind turbine 10 that rotate relative to each other to optimize the power production. Bearings are typically used to allow these relative rotations, and two are shown in FIG. 2 as examples. In particular, the rotor 16 includes a hub 18 and a plurality of blades 20 projecting radially outwardly from the hub 18. The blades 20 may be rotatably mounted to the hub 18 by respective blade bearings 28, which allow the blades 20 to be pitched into or out of the wind (the movement is generally shown in FIG. 2 by arrow 26). Therefore, rotating each blade 20 about a longitudinal axis 24 controls the amount of lift created by the wind and driving the rotation of the rotor 16.

A yaw bearing 30 is also schematically illustrated in FIG. 1. The yaw bearing 30 is positioned between the nacelle 14 and tower 12 so that the rotor 16 can be turned relative to the direction of the wind, which also affects the lift forces on the blades 20. Again, both the blade bearings 28 and yaw bearing 30 are merely examples of bearings in the wind turbine 10. Indeed, the description below focuses on a sealing system between first and second moving components in general rather than a particular bearing. The sealing system will be described in the context of one of the blade bearings 28 merely for sake of convenience.

Figure 3:
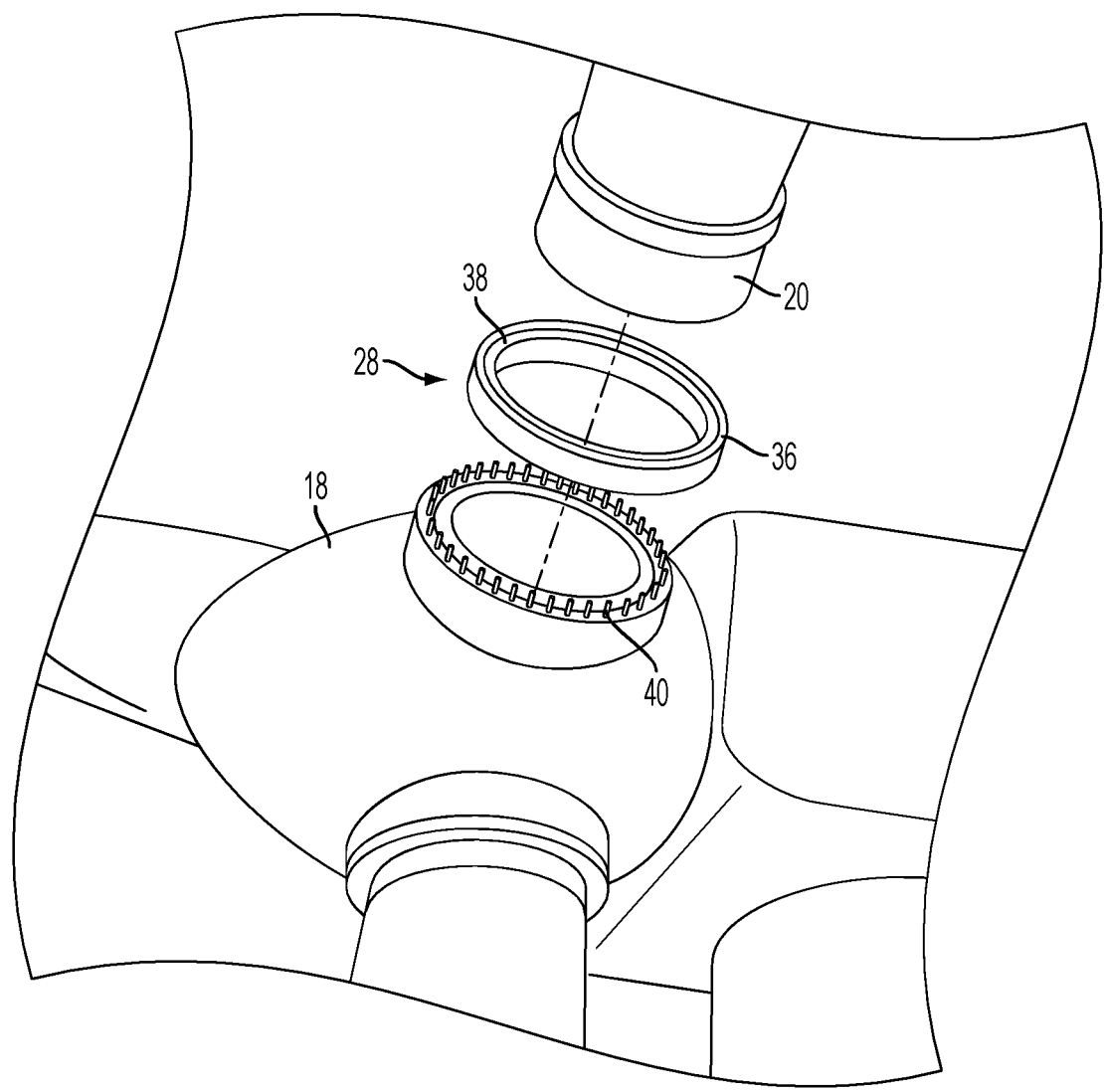
FIG. 3 is an exploded perspective view schematically illustrating a blade bearing assembly of the wind turbine of FIG. 1.
Figure 4:
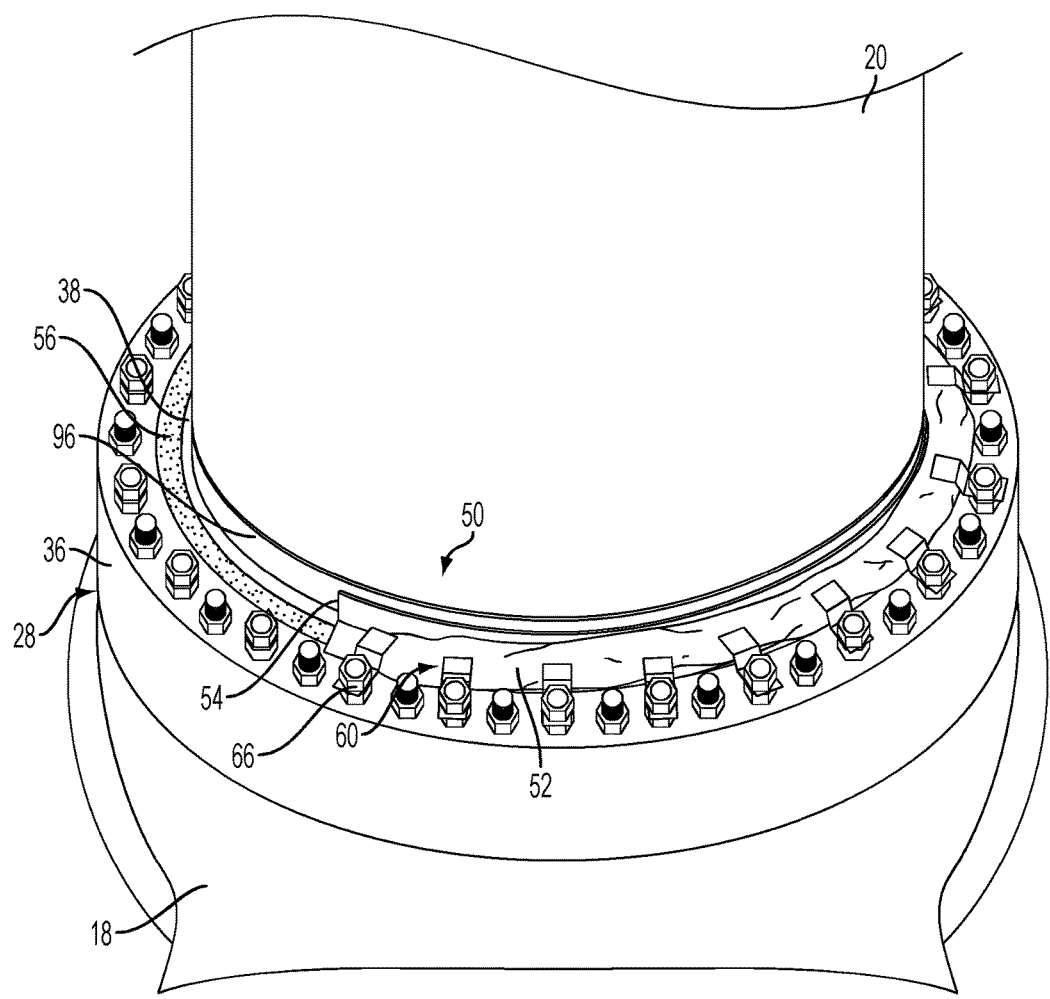
FIG. 4 is a perspective view of a portion of a blade bearing including a sealing system according to one embodiment.
Figure 5:
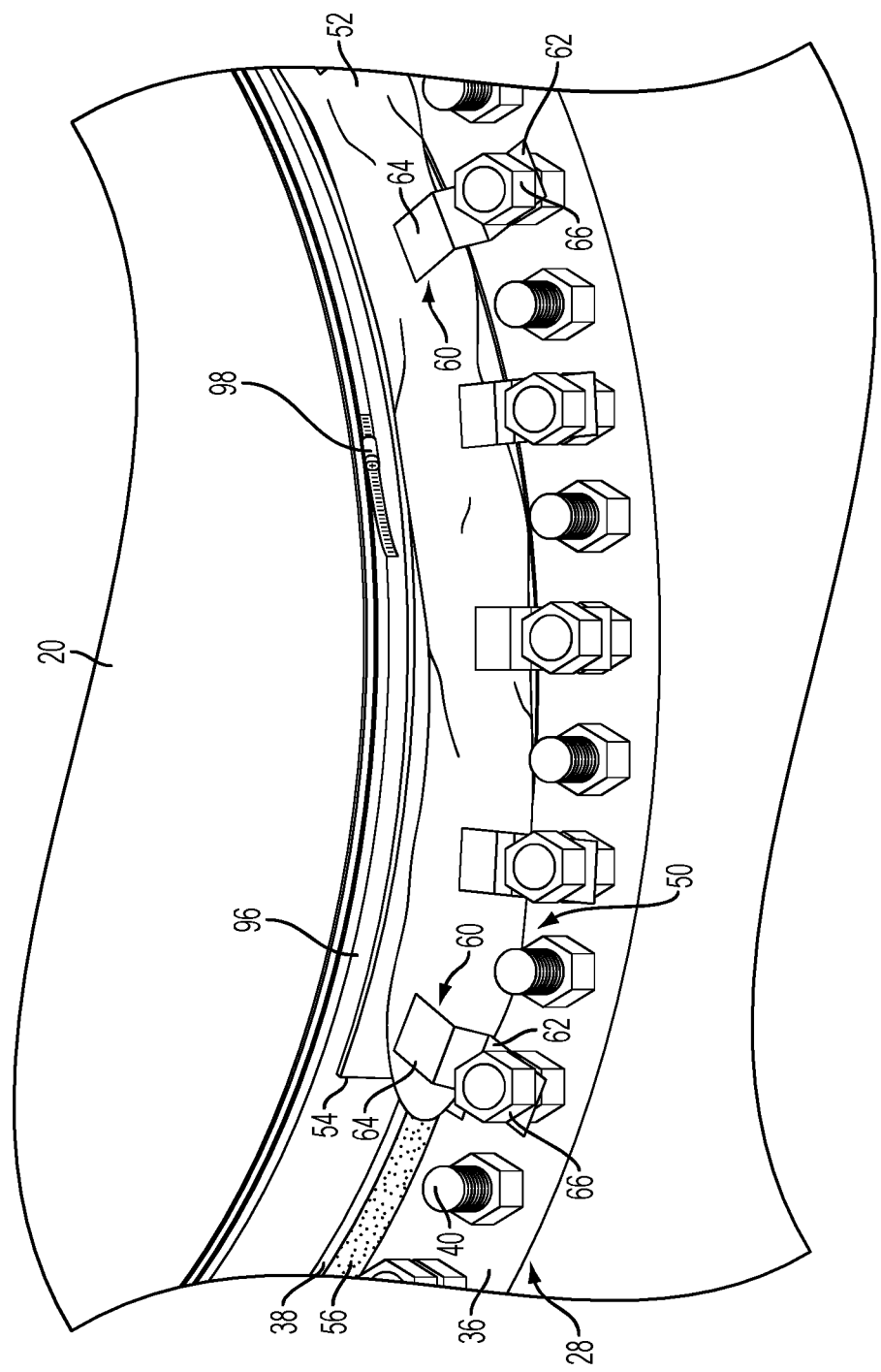
FIGS. 5-7 are enlarged perspective views, taken from different angles, of portions of the sealing system of FIG. 4.

To this end, and with reference to FIG. 3, the blade bearing 28 includes first and second rings 36, 38 movable relative to each other. A plurality of roller elements (not shown) may be provided between the first and second rings 36, 38 to facilitate this movement. In the embodiment shown, the first ring 36 is an outer ring mounted to the hub 18 by a plurality of bolts 40. The second ring 38 is an inner ring mounted to the blade 20, also by a plurality of bolts (not shown). Various components for moving the second ring 38 relative to the first ring 36, and thereby pitch the blade 20, are secured to the hub 18. These components collectively form a pitch system and may include hydraulic or electrical drives. In alternative embodiments, the first ring 36 may be mounted to the blade 20 and the second ring 38 may be mounted to the hub 18.

Lubrication is provided between the first and second rings 36, 38 to reduce friction and wear. To help confine this lubrication, and as shown in FIGS. 4-8, the wind turbine 10 further includes a sealing system 50. The details of the sealing system 50 will be described in further detail below. In general, however, the sealing system 50 comprises an absorbent element 52 and contact member 54. The absorbent element 52 is secured to the first ring 36 and comprises an oil-absorbing material. The contact member 54 is secured to the absorbent element 52 and comprises a non-absorbent material abutting the second ring 38 and/or blade 20. The combination and arrangement of these elements enables the absorbent element 52 to be used in connection with moving parts (i.e., the first and second rings 36, 38), an environment not suited for the absorbent element 52 itself. The absorbent element 52 may be used alone or as a supplement/backup to a primary seal 56 positioned between the first and second rings 36, 38. Additionally, although the figures only show the sealing system 50 on one side of the blade bearing 28, a similar sealing system may be provided on the opposite side.

In one embodiment, the absorbent element 52 is an elongated sock-like structure like those used for cleaning oil or chemical spills. The oil-absorbing material may be selected based on the type of lubrication it is intended to help confine. Examples include, without limitation: polymeric materials, cellulose-based materials (e.g., wood pulp fibers), and combinations thereof. This material may be contained within a casing of different material such that the absorbent element 52 has an outer layer and inner body. The absorbent element 52 may be long enough to extend completely around the blade bearing 28, or the sealing system 50 may include a plurality of absorbent elements 52 for this purpose. Alternatively, one or several absorbent elements 50 may be positioned to cover selected locations of the blade bearing 28.

Figure 6:
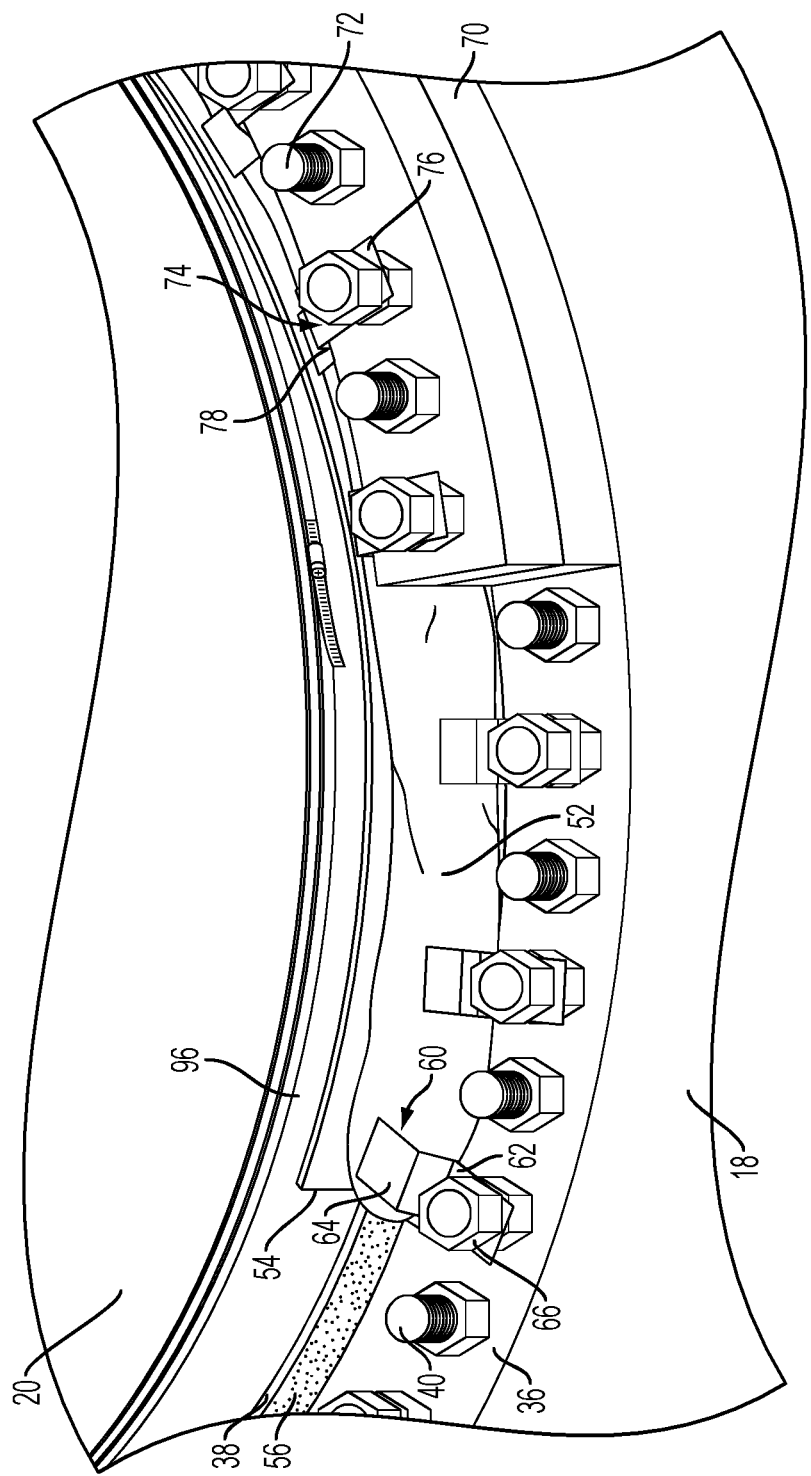
Figure 7:
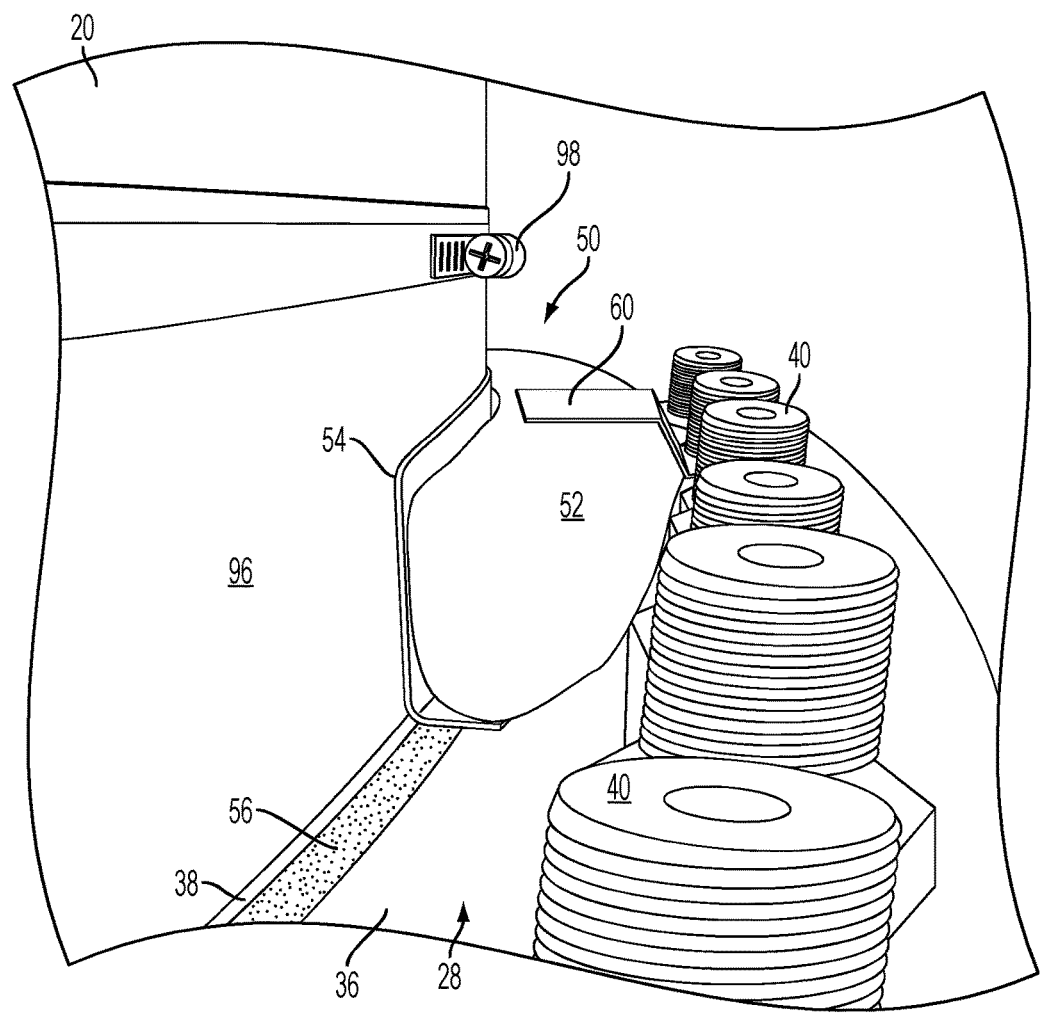

The absorbent element in FIGS. 4-7 is clamped to the first ring 36 by a plurality of brackets 60 secured to the bolts 40. More specifically, each bracket 60 includes an attachment portion 62 received over one of the bolts 40 and a clamping portion 64 extending from the attachment portion 62. The attachment portion 62 is secured by fastening a nut 66 onto the bolt 40 after positioning the bracket 60. When secured, the clamping portion 64 forces the absorbent element 52 against the first ring 36. As can be appreciated, the size and shape of the brackets 60 may vary depending on the position of the attachment portion 62 relative to the first and second rings 36, 38 when the attachment portion 62 is secured. For example, FIG. 6 illustrates a different portion of the blade bearing 28 where one or more structural elements 70 are secured to the first ring 36. The structural element(s) 70 are secured along a circumferential length of the first ring using bolts 72 to reinforce this selected area. This results in longer bolts being used such that attachment portions 76 of brackets 74 are positioned further away from the absorbent element 52 when received on the bolts 72 at these locations. To compensate for this, clamping portions 78 are provided with a longer length when compared to the brackets 60.

Figure 8:
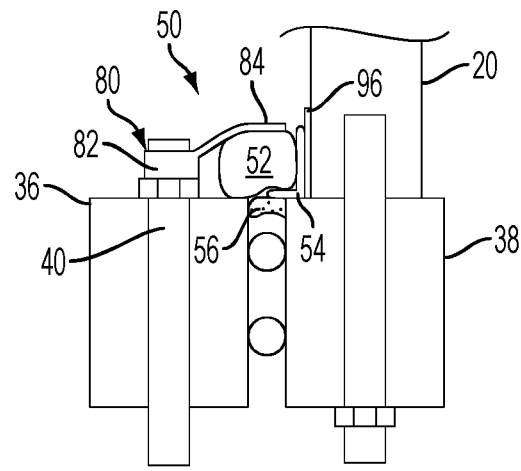
FIGS. 8 and 9 are schematic views of a sealing system according to an alternative embodiment.
Figure 9:
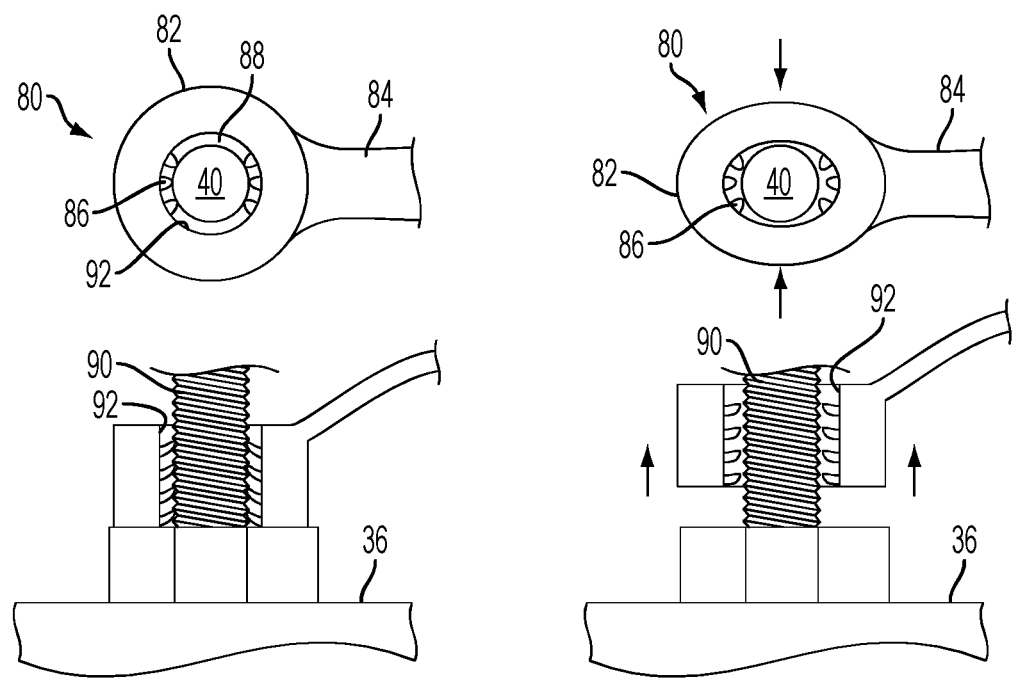

FIGS. 4-7 illustrate the brackets 60, 74 as bent pieces of metal. The brackets may alternatively or additional comprise plastic material. Indeed, in addition to providing different sizes and shapes, it will be appreciated that construction of the brackets may vary as well. FIGS. 8 and 9, for example, schematically illustrate a bracket 80 according to an alternative embodiment. The bracket 80 is a molded component including an attachment portion 82 configured to be secured to the bolt 40 without the use of additional fasteners or tools. Projections 86 (teeth, tabs, or the like) on an inner surface 92 of the attachment portion are configured to engage threads 90 of the bolts 40. Thus, when the attachment portion 82 is positioned on an exposed portion of one of the bolts 40, a ratcheting-like is provided as the attachment portion 82 is pushed downward by hand. The bracket 80 also includes a clamping portion 84, which may simply be an extension of material from the attachment portion 82.

Advantageously, the bracket 80 may be releasably secured to the bolt 40 so that it can also be removed by hand. For example, the projections 86 may only extend along certain portion of the inner surface 92, leaving gaps 88 between the inner surface 92 and threads 90 at other locations. The attachment portions 82 may be squeezed at these other locations to release the projections 86 from engagement with the threads 90, as illustrated in FIG. 11. The brackets 80 may then be lifted off of the bolts 40. Other examples of releasable connections not requiring the use of additional fasteners will be appreciated and need not be described. Again, the above-described embodiments are merely examples of possible ways of securing the absorbent element 52 to the first ring 36.

Referring back to FIGS. 5-6, the contact member 54 in the illustrated embodiment comprises a strip of plastic material to which the absorbent element 52 is secured by adhesive. The adhesive may be applied immediately before securing the contact member 54. Alternatively, the adhesive may be applied to the contact member 54 earlier (e.g., at a factory), which in turn may be provided with a peel-off cover to be removed upon use. The absorbent element 52 may be secured to the contact member 54 by other methods, such as fastening, in alternative embodiments.

The contact member 54 abuts the second ring 38 and/or blade 20, as mentioned above, but need not be in direct contact with these components. In the embodiment shown, the sealing system 50 further includes a contact strip 96 secured to the blade 20. The contact strip 96 may be constructed from the same material as the contact member 54 (e.g., plastic) and extend around all or portions of the blade 20 immediately above the second ring 38. A hose clamp 98 may extend around the blade over the contact strip 96 to secure the contact strip 96 in place. Alternatively or additionally, adhesives or fasteners may be used to secure the contact strip 96 to the blade 20.

The operation of the sealing system 50 will now be described. During operation of the wind turbine 10, the second ring 38 moves relative to the first ring 36 when the blade 20 is pitched. This movement occurs in both directions at relatively low speeds. Lubricant provided between the first and second rings 36, 38 is primarily confined to that space by the primary seal 56 of the blade bearing 28. Over time, however, leakage may develop through the primary seal 56. The lubricant does not escape between the contact member 54 and second ring 38 or blade 20 because of the abutting surfaces. Instead, the lubricant is directed to and collected by the absorbent element 52.

Thus, the sealing system 50 helps prevent lubricant from polluting nearby space in the hub 18 or on the external surfaces of the blade 20 and hub 18. A cleaner environment may be maintained, reducing or eliminating the need for cleaning prior to performing service operations. Cleaning to maintaining a desirable visual appearance (e.g., on the external surface of the blade 20) may also not be necessary, or at least may not be required to the same extent or frequency compared to wind turbines without the sealing system 50. This reduces the overall downtime of the wind turbine, and can therefore result in increased overall power production.

The sealing system 50 may be visually inspected during scheduled service operations to determine if replacement of the absorbent element 52 is required. For example, it may be possible to determine if the absorbent element 52 is approaching maximum saturation based on color, feel, or other characteristics. Leakage to nearby areas, thereby indicating full saturation, may be another indicator. Alternatively or additionally, sensors (not shown) may be provided within the absorbent element 52 to measure saturation or nearby to detect leakage beyond the absorbent element 52. In such embodiments the absorbent element 52 may be monitored remotely to determine if service should be scheduled for replacement.

The procedure for replacing the absorbent element 52 may be carried out quickly and easily. After removing the nuts 66, the brackets 60 clamping the absorbent element to the first ring 36 may be removed from the bolts 40. The absorbent element 52 itself may then be removed and disposed of in a proper manner. It may even be possible to remove the absorbent element 52 without removing the brackets 60 by simply loosening the nuts 66 until the brackets 60 can move sufficiently to relieve the clamping force. Additionally, as mentioned above, other embodiments (e.g., FIGS. 8 and 9) may involve releasable connections without nuts or other fasteners.

The absorbent element 52 may be removed with the contact member 54 remaining secured thereto. A new absorbent element (not shown), together with a new contact member secured thereto, may then be secured to the first ring 36 using the same brackets 60 or new ones. The new contact member may even be constructed and secured to the new absorbent element on site, for example, by measuring the desired length and cutting a plastic strip from a roll or other supply of material. The new contact member may then be secured to the new absorbent element by adhesive or the like, as discussed above.

Thus, replacing the absorbent element 52 requires a minimal number of steps and components. Therefore, cleaning may not be the only task reduced by the sealing system 50. When used as a backup to the primary seal 56, the sealing system 50 may also reduce or eliminate the need to replace the primary seal 56 even if its function is compromised. If the primary seal 56 becomes less effective over time and begins to leak, there may not be a need to replace the primary seal 56. The wind turbine can simply continue to operate with the sealing system 50 collecting the leaking lubrication. When service is performed, it may be sufficient to replace the sealing system 50 rather than the primary seal 56. This is a much less time-consuming and cumbersome task, as the primary seal 56 may require removal of the blade bearing 28 to be replaced.

Although the sealing system 50 has been described in connection with the blade bearing 28, the sealing system 50 may be used in the same manner in connection with the yaw bearing 30 (FIG. 2). The yaw bearing 30, like the blade bearing 28, permits relative rotation in two directions at relatively low speeds. Other applications for the sealing system 50 will be appreciated by those skilled in the art. Indeed, the embodiments described above are merely examples of the invention defined by the claims that appear below. First and second rings 36, 38 of a bearing are simply representative of first and second components movable relative to each other; other applications not involving bearing rings are possible. Moreover, the sealing system 50 may be applicable to machines other than wind turbines.

Those skilled in the design of sealing systems will appreciate additional examples, modifications, and advantages based on the description. As an additional example, the sealing system 50 may even be used without a primary seal in some embodiments.

The sealing system may also allow the lubricant to be optimized for friction reduction and in a manner that promotes sealing. An optimal balance between performance and handling can be difficult to achieve in lubricants for normal sealing systems. On the one hand, the lubricant should be an oil to minimize friction as much as possible. On the other hand, a thickener (e.g., metallic soap) is typically needed to make the lubricant easier to handle and contain. Some performance, particularly at lower temperatures, is sacrificed by adding the thickener. One embodiment of a sealing system according to the invention may address these challenges by providing an absorbent element that is oleophilic and thickener-phobic. Thus, the absorbent element may attract the oil from a lubricant but repel the soap or other thickener. If lubricant leaks from between the first and second components, the oil from this leaking lubricant is absorbed by the absorbent element while the thickener is left to collect in the area of leakage. The accumulation of thickener may become highly viscous and in this way serve to help block further leakage. This is advantageous regardless of whether the sealing system is used with or without a primary seal. Moreover, this "self-sealing" advantage may enable the use of lubricants with less thickener.

The invention claimed is:

1. A sealing system for containing lubricant, comprising:
a first component;
a second component positioned proximate the first component and movable relative thereto;
a region between the first and second components;
an absorbent element secured to the first component, the absorbent element comprising an oil-absorbent material; and
a contact member secured to the absorbent element but not enclosing the absorbent element within the contact member, the contact member abutting the second component and comprising a non-absorbent material which does not allow oil to pass through the material to reach the absorbent element,
wherein the contact member is positioned between the region and the absorbent element, and
wherein the contact member is positioned between the absorbent element and the second component such that the absorbent element is in non-contact relation with the second component.

2. The sealing system according to claim 1, wherein second component is movable relative to the first component in two directions.

3. The sealing system according to claim 2, wherein the first and second components comprise first and second rings of a bearing.

4. The sealing system according to claim 3, further comprising:
a primary seal positioned between the first and second rings, the absorbent element being positioned over the primary seal.

5. The sealing system according to claim 3, wherein the absorbent element is clamped to the first ring.

6. The sealing system according to claim 5, wherein the first ring includes a plurality of bolt holes and a plurality of bolts extending through the bolt holes, the sealing system further comprising: a plurality of brackets for clamping the absorbing element to the first ring, wherein each bracket is secured to one of the bolts.

7. The sealing system according to claim 6, wherein the brackets are releasably secured to the bolts without the use of additional fasteners.

8. The sealing system according to claim 1, wherein absorbent element comprises a structure and the contact member is secured to the absorbent element by adhesive.

9. The sealing system according to claim 1, wherein the oil-absorbent material of the absorbent element is configured to attract oil of the lubricant and repel thickener of the lubricant.

10. A wind turbine, comprising:
a tower;
a nacelle supported by the tower;
a rotor comprising a hub rotatably mounted to the nacelle and at least one blade rotatably mounted to the hub; and
a bearing positioned between the tower and nacelle or between the hub and blade, the bearing having first and second rings movable relative to each other and a primary seal positioned between the first and second rings, the first and second rings each being secured to one of the tower, nacelle, hub, or blade;
a sealing system for containing lubricant, comprising:
an absorbent element secured to the first ring, the absorbent element comprising an oil-absorbent material; and
a contact member secured to the absorbent element but not enclosing the absorbent element within the contact member, the contact member abutting at least one of the second ring and the component to which the second ring is secured, the contact member comprising a non-absorbent material which does not allow oil to pass through the material to reach the absorbent element,
wherein the contact member is positioned between the primary seal and the absorbent element, and
wherein the contact member is positioned between the absorbent element and the second ring such that the absorbent element is in non-contact relation with the second ring.

11. The wind turbine according claim 10, wherein the absorbent element is positioned over the primary seal.

12. The wind turbine according to claim 10, wherein the absorbent element is clamped to the first ring.

13. The wind turbine according to claim 12, wherein the first ring includes a plurality of bolt holes and a plurality of bolts extending through the bolt holes, the sealing system further comprising: a plurality of brackets for clamping the absorbing element to the first ring, wherein each bracket is secured to one of the bolts.

14. The wind turbine according to claim 13, wherein the brackets are secured to the bolts without the use of additional fasteners.

15. The wind turbine according to claim 10, wherein the first ring is an outer ring secured to the hub and the second ring is an inner ring secured to the blade.

16. A wind turbine, comprising:
a tower;
a nacelle supported by the tower;
a rotor comprising a hub rotatably mounted to the nacelle and at least one blade rotatably mounted to the hub; and
a bearing positioned between the tower and nacelle or between the hub and blade, the bearing having first and second rings movable relative to each other and a primary seal positioned between the first and second rings, the first and second rings each being secured to one of the tower, nacelle, hub, or blade;
a sealing system for containing lubricant, comprising:
an absorbent element secured to the first ring, the absorbent element comprising an oil-absorbent material; and a contact member secured to the absorbent element, the contact member abutting at least one of the second ring and the component to which the second ring is secured, the contact member comprising a non-absorbent material, wherein the contact member is positioned between the primary seal and the absorbent element, and wherein the absorbent element is in non-contact relation with the second ring, further comprising a contact strip secured to the component the contact member abuts, the contact member and contact strip comprising a plastic material.

17. The wind turbine according to claim 10, wherein the oil-absorbent material of the absorbent element is configured to attract oil of the lubricant and repel thickener of the lubricant.

18. A method of maintaining a clean environment in a wind turbine, comprising:

providing a primary seal to seal a lubricant between first and second components positioned proximate each other;

securing an absorbent element to the first component, the absorbent element comprising an oil-absorbent material, wherein a contact member secured to the absorbent element but not enclosing the absorbent element within the contact member abuts the second component when the absorbent element is secured to the first component, wherein the contact member comprises a non-absorbent material which does not allow oil to pass through the material to reach the absorbent element, wherein the contact member is positioned between the primary seal and the absorbent element, and wherein the contact member is positioned between the absorbent element and the second component such that the absorbent element is in non-contact relation with the second component;

operating the wind turbine so that the first and second components move relative to each other in different directions; and collecting lubricant leaking from between the first and second components with the absorbent element.

19. The method according to claim 18, wherein the first and second components are first and second rings of a bearing, and wherein securing an absorbent element further comprises:

securing the absorbent element over the primary seal positioned between the first and second rings.

20. The method according to claim 19, wherein the bearing is positioned between a tower and nacelle supported by the tower, or between a hub and blade rotatably mounted to the hub, and the first and second rings are each secured to one of the tower, nacelle, hub, or blade, and operating the wind turbine comprises:

pitching the blade relative to the hub or yawing the nacelle relative to the tower.

21. The method according to claim 18, wherein securing the absorbent element further comprises:

clamping the absorbent element to the first component with a plurality of brackets, wherein the absorbent element is releasably clamped without the use of additional fasteners.

22. The method according to claim 18, further comprising:

removing the absorbent element from the first component;

securing a new absorbent element to the first component, wherein a new contact member is secured to the new absorbent element.

23. The method according to claim 18, wherein the lubricant comprises an oil and a thickener, the absorbent element is oleophilic and thickener-phobic, and collecting lubricant with the absorbent element further comprises:

absorbing oil and repelling thickener from the lubricant such that the thickener accumulates where the lubricant is leaking.

* * * * *